Figure 24:
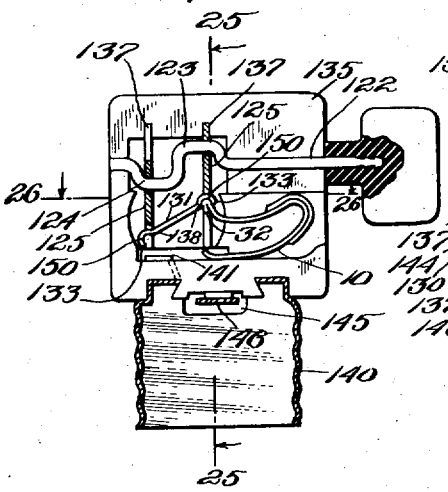

T. A. C. BOTH.
MECHANICAL MOVEMENT AND ELECTRIC LIGHT SOCKET.
APPLICATION FILED SEPT. 1, 1914.
Reissued Oct. 5, 1915.
13,990.
4 SHEETS—SHEET 1.
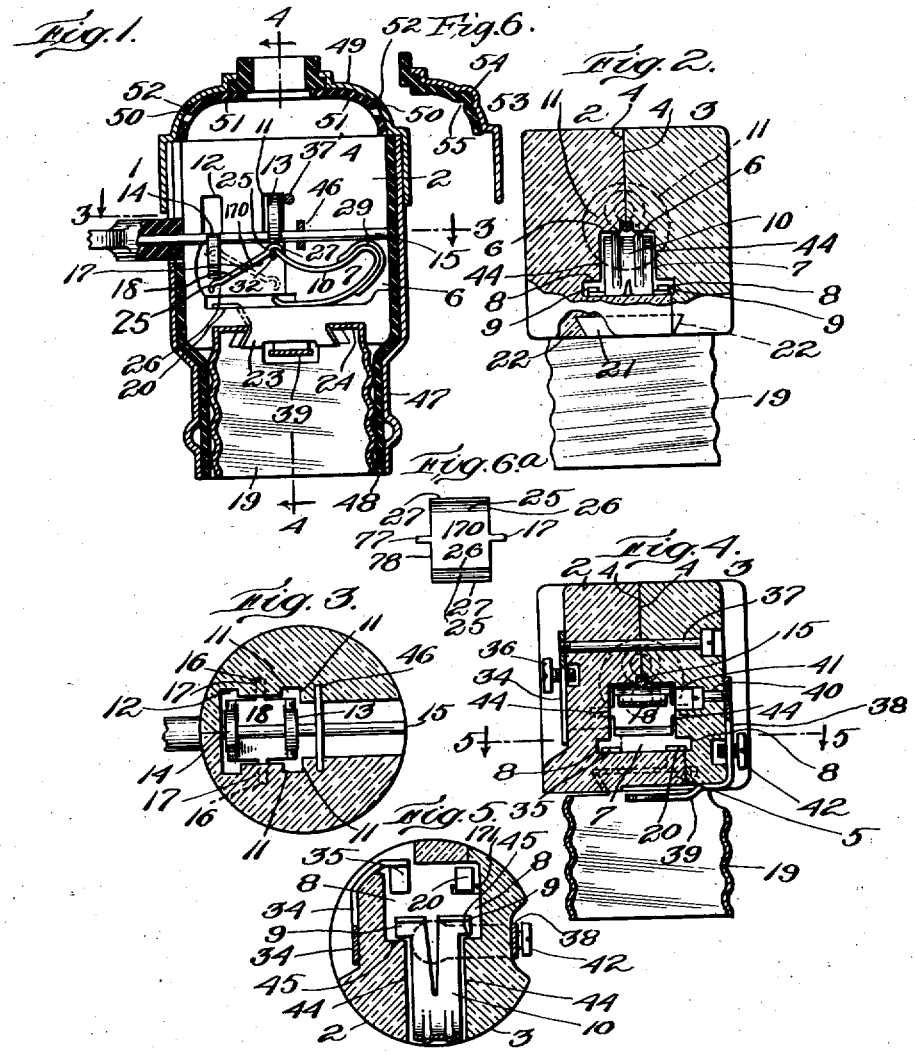
Witnesses:
Agnes M. Shea.
W. W. Harrison
Inventor:
Louis A. C. Both
by George A. Rockwell
Atty.

T. A. C. BOTH.
MECHANICAL MOVEMENT AND ELECTRIC LIGHT SOCKET.
APPLICATION FILED SEPT. 1, 1914.
Reissued Oct. 5, 1915.
13,990.
4 SHEETS—SHEET 2.
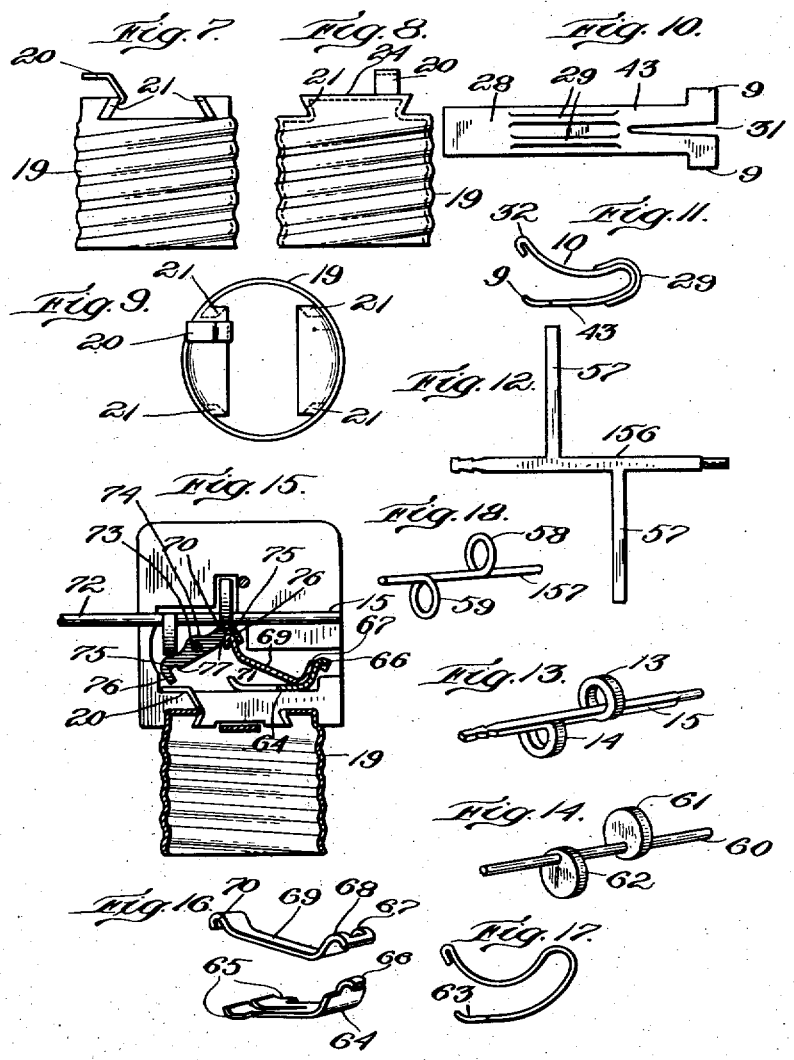
Witnesses:
Agnes M. Shea.
W. M. Harrison
Inventor:
James A. C. Both
by George A. Rockwell
atty.

T. A. C. BOTH.
MECHANICAL MOVEMENT AND ELECTRIC LIGHT SOCKET.
APPLICATION FILED SEPT. 1, 1914.
Reissued Oct. 5, 1915.
13,990.
4 SHEETS—SHEET 3.
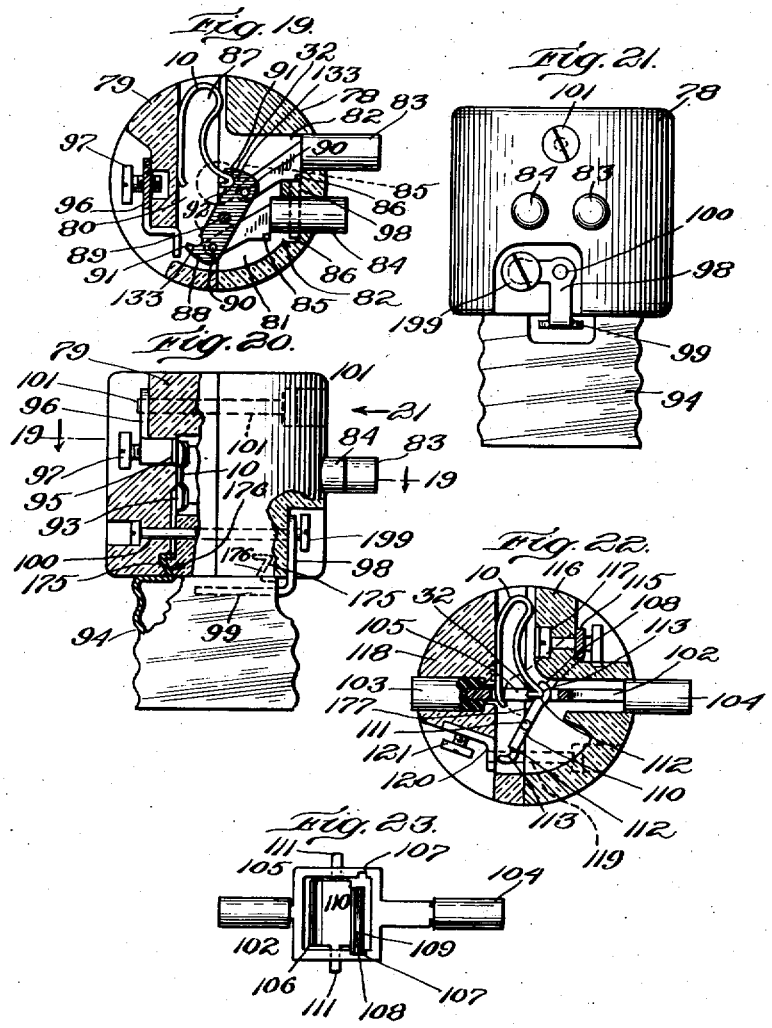
Witnesses:
Agnes M. Shea
W. W. Harrison
Inventor:
Tonjes A. C. Both
by George A. Rockwell
Atty

T. A. C. BOTH.

MECHANICAL MOVEMENT AND ELECTRIC LIGHT SOCKET.

APPLICATION FILED SEPT. 1, 1914.

Reissued Oct. 5, 1915.

13,990.

4 SHEETS—SHEET 4.

Witnesses:

Agnes M. Shea.

A. W. Harrison

Inventor:

Torjes A. C. Both by George A. Rockwell

Atty.

UNITED STATES PATENT OFFICE.

TONJES AUGUST CARL BOTH, OF FAIRHAVEN, MASSACHUSETTS, ASSIGNOR, BY MESNE ASSIGNMENTS, TO THE ZEE SOCKET AND MFG. CO., OF BOSTON, MASSACHUSETTS, A CORPORATION OF MASSACHUSETTS.

MECHANICAL MOVEMENT AND ELECTRIC-LIGHT SOCKET.

13,990. Specification of Reissued Letters Patent. Reissued Oct. 5, 1915.

Original No. 1,040,132, dated October 1, 1912, Serial No. 668,632. Application for reissue filed September 1, 1914. Serial No. 859,718.

*To all whom it may concern:*

Be it known that I, TONJES AUGUST CARL BOTH, a citizen of the United States, and a resident of Fairhaven, in the county of Bristol and State of Massachusetts, but formerly of New York, in the county of New York and State of New York, have invented certain new and useful Improvements in Mechanical Movements and Electric-Light Sockets, of which the following is a specification, taken in connection with the accompanying drawings, which form a part of the same.

My invention relates to mechanical movements adapted for universal application. Further to electric light sockets and to certain details of construction of both the mechanical movement and the electric light socket, which will be more fully hereinafter described in the specification and pointed out in the claims.

I have shown my mechanical movement as a switch mechanism in an electric light socket, to which it is particularly adapted owing to its simplicity, the few parts, and the small space occupied by them. When so used it makes a quick make and a quick break of the electric current, without arcing, upon the operation of the driving member in either direction, whether this driving member be a rotary or a reciprocating one.

Among other advantages my mechanical movement permits the socket to be formed smaller and stronger for the opening in which the mechanical movement is mounted need not be so large as for other switch mechanism. In illustrating my invention I have, therefore, by way of example, shown it as a switch mechanism in an electric light socket, but it is understood, of course, that the mechanical movement is not to be limited to this use.

Figure 25:
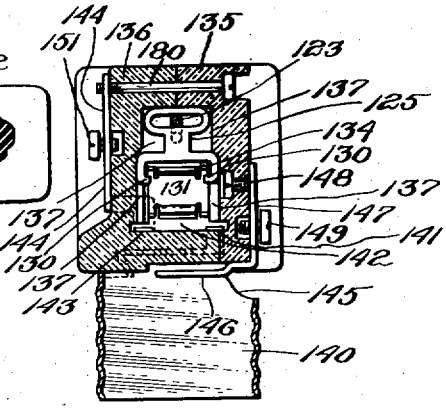
Figure 26:
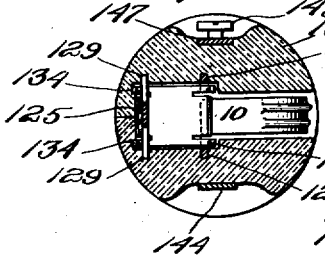
Figure 27:
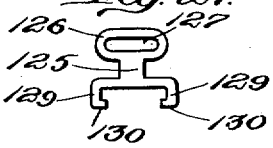
Figure 29:
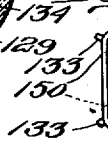
Figure 28:
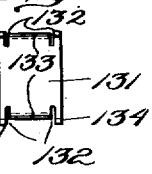

In the accompanying drawings showing illustrative embodiments of my invention and in which the same reference numerals refer to similar parts in the several figures,—Figure 1 is a central vertical section through my electric light socket equipped with my mechanical movement as a switch mechanism; Fig. 2 is a side elevation, partly broken away, of the electric light socket shown in Fig. 1, the cap and casing being omitted for the purpose of clearer illustration; Fig. 3 is a transverse horizontal section substantially on the line 3—3 of Fig. 1 looking down in the direction of the arrows; Fig. 4 is a longitudinal vertical section substantially on the line 4—4 of Fig. 1 looking in the direction of the arrows; Fig. 5 is a horizontal section substantially on the line 5—5 of Fig. 4; Fig. 6 is a fragmentary vertical section of a part of the cap and insulation showing a modification; Fig. 6[a] is a plan view of the intermediate member sometimes termed the rocking hill and valley member; Fig. 7 is a detail side elevation of the screw shell used in Fig. 1; Fig. 8 is a detail side elevation of the same screw shell which is shown rotated 90° from the position shown in Fig. 7; Fig. 9 is a plan view of the screw shell shown in Fig. 7; Fig. 10 is a plan view of the blank from which the resilient driven member is made; Fig. 11 is a side elevation of the resilient driven member formed from the blank shown in Fig. 10; Fig. 12 is a blank from which one form of driving member, that shown in Fig. 13, is made. Fig. 13 is a perspective view of one form of driving member; Fig. 14 is a perspective view of a modified form of driving member; Fig. 15 is a longitudinal vertical section of a modified construction; Fig. 16 is a perspective view of a resilient driven member made in two parts; Fig. 17 is a side elevation of another modified form of resilient member in which ribs are not employed; Fig. 18 is a perspective view of still another modified form of driving member made from twisted wire; Fig. 19 is a transverse horizontal section substantially on the line 19—19 of Fig. 20 showing a modification in which two push buttons are used; Fig. 20 is a side elevation partly broken away of the modification shown in section in Fig. 19; Fig. 21 is a side elevation of the modification shown in Figs. 19 and 20 looking in the direction of the arrow 21 in Fig. 20; Fig. 22 is a transverse horizontal sectional view showing a still further modification in which a double-headed push button or driving member is used; Fig. 23 is a detail plan view of the driving member shown in Fig. 22, a portion of the intermediate member or movable hill and valley member being also shown partly broken away; Fig. 24 is a longitudinal vertical section showing a still further modification, the insulating member being shown in side elevation; Fig. 25 is a longitudinal vertical section substantially on the line 25—25 of Fig. 24; Fig. 26 is a transverse horizontal section; substantially on the line 26—26 of Fig. 24; Fig. 27 is a detail plan view of a punching forming a connecting member or link between the driving member and the intermediate or hill and valley member of Fig. 24; Fig. 28 is a plan view of the intermediate or hill and valley member of Fig. 24; and Fig. 29 is a side elevation of the intermediate or hill and valley member shown in Fig. 28.

In the illustrative embodiments of my invention shown in the drawings, 1 is an electric light socket formed of two complementary insulating members 2 and 3 having meeting surfaces 4, 4, Fig. 2 which coincide substantially with the longitudinal axis of the electric light socket though portions of the meeting surfaces are preferably offset as at 5 in Fig. 4. These insulating members 2 and 3 are preferably formed from porcelain and without cross holes, and each of them is provided with a recess 6 which together form an interior recess or chamber 7 for the reception of my mechanical movement when it is used as a switch mechanism in this form of electric light socket. Each of the recesses 6, 6 has an offset or deeper recess 8, Figs. 2, 3 and 4, which form guides for the offset portions 9, 9, Figs. 2, 5 and 10, of the resilient driven member 10. I also form in the coöperating faces of each of the insulating members 2 and 3 two semicircular openings 11 and 12 to receive the respective cams 13 and 14 carried by the driving member 15. The recesses 16, 16 Fig. 3, are also molded in the surfaces of the insulating members 2 and 3 for the reception of the trunnions 17, 17, Fig. 6ª of the intermediate or movable hill and valley member 18. I attach the insulating members 2 and 3 to a lamp holding member, which is usually, though not necessarily, in the form of a screw shell 19. The upper portion of this screw shell 19 is provided with a lip 20, Figs. 7, 1 and 4 which extends up into the interior chamber 7 and forms one contact. I also preferably provide the head of this screw shell 19 with a dovetail 21, Figs. 8, 7 and 9 to coöperate with the dovetails 22, 22, Fig. 2, formed in the respective insulating members 2 and 3. I also preferably provide each of the insulating members 2 and 3 with another dovetail 23, Fig. 1, which takes under the head 24 of the screw shell 19.

The intermediate or movable hill and valley member 18 is provided at each end with a "valley" 25, each "valley" having a ledge or shoulder 26 and a boot, kicker or accelerator 27. The "hill" 170 is that portion of the intermediate member which connects the two valleys, Figs. 1 and 6ª.

The preferred form of resilient driven member is formed from a stamping. A blank 28, Fig. 10, is stamped from sheet metal and provided with strengthening ribs 29, 29 which are preferably rolled, stamped or otherwise formed. I also preferably provide the blank with offsets 9, 9, one end 43 of the blank being preferably slotted by the slot 31, Fig. 10. When this blank 28 is bent back upon itself, the resilient driven member 10 is formed, one end being further preferably bent back upon itself to make an engaging arm 32, Figs. 1 and 11, which is adapted to be received in the valleys 25, 25 in the intermediate or movable hill and valley member 18, and to coöperate with the ledge 26 and with the boot, kicker or accelerator 27 in a manner to be hereinafter described.

From the mechanism so far described, dealing more particularly with the mechanical movement, the rotation of the driving member 15 in either direction will cause the cams 13 and 14 to operate the intermediate member 18 and through it operate the driven member 10 converting a slow or fast rotary motion into a quick and positive reciprocating motion. In the position of the parts shown in Fig. 1, the rotation of the driving member 15 in either direction will cause the cam 13 to coöperate with the raised end of the intermediate or movable hill and valley member 18 which will cause this member to rock upon its trunnions 17, 17, held within the openings 16, 16, in the respective insulating members 2 and 3. The rocking of this member will cause the two separated ends of the resilient driven member 10 to approach each other and thereby store up energy in this member 10. I preferably so form the valleys 25, 25 in the member 18, and more particularly the relative locations of the ledges 26 and accelerators 27, that at the first portion of the rocking movement of the member 18 the ledge 26, Fig. 1, will prevent the end 32 of the resilient member 10 from escaping from the valley 25 within which it is then engaged. Further downward movement of the cam 13, upon the rotation of the driving member 15 in either direction, will store up additional power in the resilient member 10 which will have its end 32 held within the valley 25 until such time as the maximum energy shall have been imparted to the spring 10 up to which point the ledge 26 will have held the end 32 from escapement. When, however, the predetermined amount of power in the spring has been reached the rotation of the intermediate member 18, upon its own axis, will have brought it into substantially the position shown in dotted lines in Fig. 1 when the accelerator or kicker 27 will crowd or kick it out of the valley 25 and over the ledge 26. The resilient driven member 10 will then instantly with a quick sharp snap, slide up the inclined intermediate hill 170 of the hill and valley member 18 until its end 32 engages with the elevated or raised valley 25. In doing this, however, the entire resilient driven member 10 will be instantly moved bodily with a positive sharp snap to the left of the position shown in Fig. 1. Upon again rotating the driving member 15, in either direction, the cam 14, which will then be raised, will cause the end of the member 18 with which it coöperates to be depressed and this will store up energy in the resilient member 10 until such time as the end 32 is pushed, kicked or crowded by the accelerator 27 out of the valley 25 at that end of the member 18 and over its ledge 26 when the end of the spring 32 will instantly, with a quick and positive snap move up the inclined surface 170 of the member 18 until the end 32 is caught in the valley 25. At the same time that this surface 32 is moving up the inclined hill 170 of the member 18, the entire resilient member 10 moves or snaps over instantly into its opposite position, that shown in full lines in Fig. 1. Continued rotation of the driving member 15, in either direction, will cause the driven member 10 to reciprocate with a quick and positive snap.

This mechanical movement may be used wherever it is desirable to employ such a device.

I have illustrated this mechanical movement as a switch mechanism in an electric light socket. When so employed upon the rotation of the driving member 15, which in the form of the invention shown in Fig. 1 is a key shaft, in either direction, the resilient driven member 10 will make a quick make or a quick break of the electric current without arcing, due to the fact that this driven member 10 reciprocates with a quick snap. In my improved electric light socket, the lip 20 of the screw shell 19 is preferably formed integral with the screw shell and bent up in the position shown in Fig. 7. In assembling the two insulating members 2 and 3 this lip 20 extends up into the chamber 7 formed between the insulating members 2 and 3 and is one of the contacts as shown in Figs. 1 and 4. A groove 171, Fig. 5, preferably formed partly in each of the insulating members 2 and 3 permits the parts to be more readily assembled. I also employ a binding post 34 having a bent arm 35 which extends within the chamber 7 and adjacent, but separated from, the lip 20 of the screw shell 19, Figs. 4 and 5. This binding post 34 is provided with a binding screw 36 and coöperates with a locking screw 37, Fig. 4, which passes through the two insulating members 2 and 3 and holds them together. This single locking screw 37 not only holds the binding post 34 to the insulating members 2 and 3 and holds the two insulating members together, but also holds the screw shell 19 to the insulating members 2 and 3 by reason of their coöperating interlocking surfaces. The other binding post 38 is provided with a bent arm 39, Fig. 4, which extends through an opening in the screw shell 19 and becomes the center contact of the electric light socket. This binding post 38 is secured to the insulating member 3 in any suitable manner such as by means of the screw 40 which is seated in the opening 41. With the particular arrangement shown, the screw 40 is caused to engage with the binding post 38 before the two insulating members 2 and 3 are assembled. This binding post is also provided with a binding screw 42. Upon the rotation of the key or driving shaft 15 in either direction, the cam 13 or 14, as the case may be, will coöperate with the intermediate or hill and valley member 18 and cause the resilient driven member 10, which is formed of some conducting material, such as metal, to store up energy in the manner previously described. When sufficient energy has been stored up in the spring or driven member 10, which will be about when the driven member reaches the position shown in dotted lines in Fig. 1, the kicker or accelerator 27 will crowd the end 32 of the resilient driven member out of the valley 25 and over its ledge 26. This will then cause the entire resilient driven member 10 to fly over with a positive snap from the position shown in Fig. 1, and at the same time, the consuming device, whatever it may be, will be thrown into circuit by the end 43 of the resilient member 10 contacting with the arm 35 of the binding post 34 and with the lip 20 of the screw shell 19, the current passing through the resilient driven member 10. To disconnect the consuming device, it is merely necessary to rotate the driving member 15 or key shaft, in either direction, when power will be again stored up in the resilient driven member until such time as the intermediate or movable hill and valley member 18 has reached substantially the position shown in full lines in Fig. 1, when the resilient driven member 10 will, with a quick and positive snap fly over to the position shown in full lines in Fig. 1, when the current will be disconnected or broken instantaneously and without arcing.

To guide the resilient member 10 I preferably bring the walls 44, 44 of the recesses 6, 6 up adjacent to the spring member 10, Figs. 2 and 4. The offsets 9, 9 of the spring member 10 are received in the enlarged or deeper recesses 8, 8, the shoulders 45, 45, Fig. 5, serve as an additional precaution and act as stops to prevent the driven member 10 from snapping over too far to the right of Fig. 1. Ordinarily this movement will be limited by the end 32 contacting with the elevated valley 25 of the intermediate member 18, as shown in Fig. 1. Should there, however, be any tendency to an excessive lateral movement, the stops 45, 45, Fig. 3, will prevent it.

The end of the driving member 15 is supported between the insulating members 2 and 3 in any suitable manner, such as by means of the bearing 46, Figs. 1 and 3.

The intermediate member 18 which I have for purposes of description termed a movable hill and valley member, is preferably formed from a stamping and preferably in one integral piece as shown in Fig. 6[a]. It is, of course, to be understood, however, that it may be otherwise made.

I have found in practice that the ribs 29, 29 greatly strengthen the resilient driven member 10 and permit me to use a much cheaper and thinner metal than I would otherwise use if the strengthening ribs 29 were not employed. They prevent the metal, under excessive use, losing its resiliency.

The insulating members 2 and 3 and the screw shell 19 are surrounded with a casing 47 having an interior insulation such as the fiber lining 48, Fig. 1. The cap 49 is preferably provided with one or more punched or other openings 50, 50, Fig. 1, the insulation 51 having one or more punched teeth 52, 52 to snap into the openings 50 in the cap 49. This is a very cheap and serviceable manner of assembling and attaching the cap and insulation together. Instead of forming openings in the cap I may form in the cap 53 one or more indentations 54 for the reception of the punched up finger 55 in the fiber insulation 56, Fig. 6.

The driving member may be formed in various ways. Preferably I form it from a stamping 156, Fig. 12, having the arms 57, 57 which are bent back upon themselves forming the cranks 13 and 14, Figs. 13. Instead of this form, however, I may form the driving member 157 from wire or similar material, Fig. 18, and bend it to form the cams 58, 59. Other various ways of providing the driving member with cams may be employed such as for example, having the driving member 60 provided with two disks 61, 62 eccentrically mounted on the shaft or driving member, Fig. 14.

In some cases I may employ a resilient driven member 63, Fig. 17, without using the strengthening ribs 29, 29, the resilient member shown in this figure being substantially the same as that illustrated in Fig. 11 with the exception that these strengthening ribs are not employed. I have also found in practice that a very desirable resilient member is one which can be formed from a plurality of stampings. I have shown such a member disassembled in Fig. 16 in which the shoe 64 is formed from one stamping and provided with the offsets 65, 65 and with a hook 66 which fits in an opening 67 in the arm 68 of the upper member 69 which is provided with an engaging surface 70 to coöperate with a movable intermediate or hill and valley member such for example as 18 in Fig. 1. On assembling these two spring members a strong two-part resilient driven member 71 is formed such as illustrated in Fig. 15.

In many instances I have found that it is quite desirable to insulate the key or driving member 15 from the switch mechanism so that the metal key or a key formed of other conducting material may be placed upon the end 72 of the driving member. It is often quite desirable to have the metallic key harmonize with the metal of the casing or the cluster or other installation with which it is used. With such a device a key may be placed upon the end 72 of the driving member which would be of the same material and ornamented in the same way, if desired, as the metallic casing or installation, or some other metal may be used to make the key which would blend with any particular color scheme. I have shown such a construction in Fig. 15 in which the intermediate or hill and valley member 73 is formed of porcelain or other suitable insulating material and rocks upon the pivot 74 held within the two-part insulating base. This insulating member is provided with valleys 75, 75, kickers or accelerators 76, 76, and with ledges 77, 77 in all respects substantially similar to the corresponding element of the intermediate member 18, Fig. 1; its operation, upon the rotation of the driven member 15 in either direction, being the same causing the electric current to be made or broken with a quick snap and without arcing by having the shoe 64 connect the contact (not shown) with the lip 20 of the screw shell 19. The current is disconnected and the entire resilient member 71 forced to the right with a quick and positive snap and without arcing the current by further rotating the driving member 15 in either direction in the same manner as previously described in the other construction.

My mechanical movement is also adapted to be used with a push button switch. My invention comprises such a device and further, an electric light socket in which two push buttons are located adjacent to each other and on the same side of the socket. In Figs. 19, 20 and 21, I have shown such a construction. Here the insulating member is formed also of two complementary parts 78 and 79 each of them being provided with recesses 80 and 81 to form an interior chamber within which my mechanical movement is mounted. The recess 81 in the members 78 is provided with two openings 82, 82 to receive the push buttons 83 and 84. These buttons are provided with shoulders 85, 85 which coöperate with the shoulders 86, 86 in the insulating member 78 to limit the outward movement of the respective push buttons. In this form I may use any one of my driven members such for example as 10, which will be caused to reciprocate with a quick snap within the chamber 87 formed by the two openings 80, 81 in the members 78, 79. While I may use any form of intermediate movable, or hill and valley member, I preferably use such a member formed out of insulating material such as 88 which is pivoted on the pin 89 and is connected, at its respective ends, to the push buttons 83, 84 by the pins 90, 90. By pushing in the push button 83 the intermediate movable hill and valley member 88 will be caused to rock, in the manner previously described for the other intermediate members, and will store up the power in the driven resilient member 10, in the same manner as in the other forms, until such time as the kicker or accelerator 91 crowds or pushes the end 32 of the resilient driven member 10 out of the valley 133 and over the ledge 92 when the entire resilient member 10 will snap over with a quick snap and make a connection between the screw shell contact 93, Fig. 20, carried by the screw shell 94 and the contact 95 of the binding post 96 carrying the binding screw 97. To disconnect the consuming device, it is merely necessary to depress the push button 84 which will have then been elevated. Alternate pressure upon the push buttons, which are for the moment extended, will cause the spring member 10 to alternately snap into and out of contact with the contacts 93 and 95. In this form the binding post 98 is provided with an arm 99 which is the center contact for the consuming device. This binding post 98 is provided with a binding screw 199 and is held to the insulating member 78 by means of the locking screw 100. The binding post 96 is secured to the insulating member 79 by the locking screw 101 which is passed through the insulating members in the opposite direction from the locking screw 100. In this manner the insulating members are secured together at the same time that these screws secure the binding post to the insulating members. The same operation will also secure the screw shell 94 to the insulating members 78, 79 by holding the dovetail surfaces 175 on the insulating members in contact with the dovetail 176 on the screw shell 94.

My invention also comprises an electric light socket actuated by a push-through button extending on either side of the socket. I have shown such a construction in Figs. 22 and 23. In this form of my invention the driving member 102, Fig. 23, is provided with the opposed buttons 103, 104 and with an intermediate hollow portion 105 having an opening 106. It is also provided with notches 107, 107 for the reception of one end 108 of the accelerator or kicker 109. This accelerator or kicker is mounted upon the intermediate rocking or hill and valley member 110 pivoted by the pins 111, 111. The engagement of the edges of the accelerator 108 with the openings 107, 107 in the enlarged portion 105 of the driving member 102 forms a pivoting connection between the rocking intermediate member 110 and the laterally reciprocating driving member 102. Whichever way the driving member 102 is reciprocated the intermediate member 110 is therefore caused to rock upon the pins 111, 111. In this form of my invention by pressing for example upon the push button 104 the driving member 102 is caused to move to the left from the position shown in Fig. 22, this motion being transmitted to the rocking member 110 through the walls of the slot 107 coöperating with the accelerator 108, and power is stored up within the resilient driven member 10 until such time as the accelerator or kicker 108 crowds the end 32 of the spring or driven member 10 out of the valley 113 over the ledge 112 when this end 32 will be caused to move down the hill 177 of the plate or intermediate member 110 until the end 32 snaps into the similar valley 113 in the other end of the intermediate or hill and valley member 110. In doing this, however, the entire resilient member 10 is caused to move with a quick and positive snap through the opening 106 in the driving member 102 and make or break the electrical connections (not shown) in this form of the electric light socket. The binding post 115 is held to the insulating portion 116 by the screw 117. The two insulating portions 116, 118 are held together by means of the locking screw 119 which coöperates with the binding post 120 on which is mounted the binding screw 121.

Another form of my invention is a mechanical movement in which the intermediate or rocking hill and valley member is carried by separate members coöperating with the driving member. This form of my invention is illustrated in Figs. 24 to 29 inclusive. My invention also includes the electric light socket therein disclosed. The driving member 122 in this form of my invention is provided with cranks 123, 124 upon which are mounted links 125, 125, one link being mounted upon each crank. These links are preferably formed out of stamped metal, and, as shown in Fig. 27, comprise a head 126 having a slot 127 for the reception of the cranks 123 or 124, as the case may be, and are further provided with legs 129, 129 having bent in portions 130, 130, Fig. 27. Upon the legs 129 I mount my intermediate or movable hill and valley member 131 which is preferably formed out of a single stamping its ends being cut at 132, 132 to form the kickers or accelerators 133, 133, the valleys 150, 150 and the arms 134, 134. By way of example I have shown the kickers or accelerators bent up in one direction, and the arms 134 in the opposite direction, Fig. 29. These arms 134, 134 coöperate with the bent in portions 130 of the links, leaving the bent up portions or accelerators 133 free to coöperate with the end 32 of the resilient driven member 10. The two coöperating insulating members 135, 136 are provided with guide grooves 137, 137 within which slide the links 125, 125. By rotating the driving member 122 in either direction, the cranks 123, 124 will reciprocate the links 125, within their grooves 137, carrying with them the intermediate or movable hill and valley member 131. If the driving member 122 is rotated in either direction from the position shown in Fig. 24, the elevated link 125 will cause the end of the plate 131 with which it coöperates, to move down and cause the two ends of the resilient driven member 10 to approach each other until such time as the accelerator or kicker 133 will crowd or force the end 32 out of the valley 150 and over the ledge 138 of the member 131 when the spring or resilient driven member will instantly snap over with a quick and positive snap from the position shown in Fig. 24 to the left until the entire driven resilient member has been moved to the left and its end 32 has been received in the other valley 150 of the intermediate member 131. This movement is instantaneous once the end 32 is released from the particular valley 150 with which it happens to be in engagement. The end of the member 131 which is now shown depressed will then be elevated. By then rotating the driving member 122, in either direction, the resilient driven member will be caused to snap back into the position shown in Fig. 24.

I have shown this mechanical movement as a switch mechanism in an electric light socket in which the screw shell 140 has a contact 141, Fig. 25, which extends within the opening 142 between the insulating members 135, 136 and spaced from the contact 143 carried by the binding post 144. The electric current will be made or broken with a quick and positive snap without arcing so that both a quick make and a quick break will be made upon the rotation of the driving member 122 in either direction. The screw shell 140 is cut away at 145 so that the center contact 146 which is preferably an arm of the binding plate 147, may be inserted. This binding plate 147 is secured to the insulating member 135 by means of the screw 148. The binding screw 149 is carried by the binding plate 147. The binding post 144, carrying the binding screw 151, is secured to the insulating member 136 by means of the locking screw 180 which serves at the same time to secure the two insulating members 135, 136 together.

It is, of course, to be understood that while I preferably use one kicker or accelerator with each groove or valley I may in all forms of my invention omit such accelerators or use only one even if two grooves or valleys are used.

Having thus described this invention in connection with illustrative embodiments thereof to the details of which I do not desire to be limited, what is claimed as new and what it is desired to secure by Letters Patent is set forth in the appended claims.

What I claim is:

1. In a mechanical movement the combination of a rotary driving member, a pivoted member operated by the driving member but having an axis transverse to the axis of the driving member, and a spring coöperating with the pivoted member to store energy in said spring.

2. In a mechanical movement the combination of a rotary driving member provided with two opposed cams and a rocking member on an axis transverse to the axis of the driving member and operated directly by said cams, and a spring coöperating with the rocking member to store energy in said spring.

3. An electric light socket comprising an insulating base; a fixed terminal on said base; and a switch mechanism for making and breaking the circuit through said fixed terminal including a rotary driving member, a spring, a rocking member operated by the driving member and storing energy in said spring, and a movable terminal operatively connected with the spring and moved thereby into and out of contact with the fixed terminal.

4. An electric light socket comprising an insulating base; a fixed terminal on said base and a switch mechanism for making and breaking the circuit through said fixed terminal including a rotary driving member, a spring, a rocking member reciprocated by the driving member and having its axis transverse of the axis of the driving member and storing energy in said spring, and a movable terminal operatively connected with the spring and moved thereby into contact with the fixed terminal.

5. An electric light socket comprising an insulating base; a fixed terminal on said base; and a switch mechanism including a rotary driving shaft and a pivoted member reciprocated by said driving shaft and including a spring member coöperating with said pivoted member to give a quick make and quick break of the circuit through said terminal.

6. In a mechanical movement the combination of a rotary driving member, a rocking member reciprocated by the driving member but having an axis transversely arranged with relation to the axis of the driving member, and a spring coöperating with the rocking member to store energy in said spring.

7. An electric light socket comprising an insulating base, terminals on said base, and a switch mechanism for making and breaking the circuit through said terminals including a rotary driving shaft and a pivoted member operated by said shaft, and including a spring coöperating with said pivoted member to move a movable terminal into engagement with said terminals on the base.

8. An electric light socket comprising an insulating base, terminals on said base and a switch mechanism for making and breaking the circuit through said terminals including a rotary shaft having an offset and a member pivoted on an axis transverse to the axis of said shaft, said member being operated by the offset portion of said shaft, and including a spring coöperating with said pivoted member to move a movable terminal into engagement with said terminals on the base.

9. In a mechanical movement the combination of a driving member, a separate resilient laterally movable driven member adapted to move laterally with relation to both the rocking and driving members, and an intermediate rocking member actuated by the driving member and adapted to actuate the resilient driven member and cause it to move laterally with relation to both the rocking and driving members.

10. In a mechanical movement, the combination of a driving member, a resilient driven member and a separate movable member provided with holding grooves or valleys at each of its ends to receive and cooperate with a portion of the resilient driven member.

11. In a mechanical movement the combination of a driving member, a resilient driven member and a separate movable member provided with holding grooves or valleys at each of its ends to receive and cooperate with a portion of the resilient driven member and with one or more accelerators or kickers.

12. In a mechanical movement, the combination of a driving member, a laterally resilient driven member, and pivoted means mounted independently of the driving member and coöperating with the driving and driven members and actuated by the driving member to cause the driven member to move laterally.

13. In a mechanical movement, the combination of a driving member, a laterally movable resilient driven member adapted to move laterally with relation to the driving member, and independent pivoted means cooperating with the driving and driven members and actuated by the driving member to cause the driven member to move laterally.

14. In a mechanical movement, the combination of a driving member, a laterally movable resilient driven member adapted to move laterally with relation to the driving member, and an independent intermediate member provided with surfaces to coöperate with the resilient driven member.

15. In a mechanical movement, the combination of a driving member, a laterally movable resilient driven member, a movable intermediate member provided with means to coöperate with and hold the resilient driven member during a portion of the movement of the intermediate member.

16. In a mechanical movement, the combination of a driving member, a resilient driven member having a surface coöperating with the intermediate member, a movable intermediate member, means carried by the movable intermediate member to hold the resilient driven member for a portion of the movement of the intermediate member, and additional means carried by the intermediate movable member to force the engaging surface of the driven member past the first means upon further movement of the intermediate member.

17. In a mechanical movement, the combination of a driving member, a resilient driven member and an intermediate movable member provided with valleys or grooves, ledges and with one or more kickers or accelerators to crowd the end of the resilient driven member over the ledge upon the movable intermediate member reaching a predetermined position.

18. In a mechanical movement, the combination of a rotary driving member, a reciprocating resilient driven member, and separate independent means located between the driving and driven members and coöperating with the rotary driving member and reciprocating resilient driven member, and actuated by the rotary driving member adapted to cause the driven member to move laterally.

19. In a mechanical movement, the combination of a rotary driving member, a reciprocating resilient driven member, and pivoted means mounted independently of the driving member coöperating with the driving and driven members and actuated by the driving member adapted to cause the driven member to move laterally.

20. In a mechanical movement, the combination of a rotary driving member, a reciprocating resilient driven member, an independently movable intermediate member mounted between the driving and driven members and provided with surfaces adapted to hold the reciprocating resilient driven member for a portion of the movement of the intermediate member.

21. In a mechanical movement, the combination of a driving member, a reciprocating resilient driven member, a movable intermediate member, means carried by the intermediate member to hold the reciprocating resilient driven member for a portion of the movement of the intermediate member, and additional means carried by the movable intermediate member to force the engaging surface of the resilient driven member past the first means upon further movement of the intermediate member.

22. In a mechanical movement, the combination of a rotary driving member, a reciprocating resilient driven member and an intermediate movable member provided with valleys or grooves to coöperate with the engaging surface carried by the reciprocating resilient driven member.

23. In a mechanical movement, the combination of a rotary driving member, a reciprocating resilient driven member, and a movable intermediate member provided with valleys or grooves and ledges and with one or more kickers or accelerators to crowd the end of the resilient driven member over the ledge upon the movable intermediate member reaching a certain predetermined position.

24. An article of manufacture for a mechanical movement comprising a driving member made from a single blank having offset arms which are bent or curved to form opposed cams.

25. An article of manufacture for a mechanical movement comprising an intermediate or integral hill and valley member formed from sheet metal and provided with kickers.

26. In a mechanical movement, the combination of a driving member, a driven member, an intermediate movable member and means carried by the intermediate member to hold the driven member when the intermediate member is in one position and to positively move the driven member when the intermediate member has reached a different position.

27. In a mechanical movement, the combination of a driving member, a resilient driven member, an intermediate rocking member, and means carried by the intermediate rocking member to hold the driven resilient member when the intermediate rocking member is at one angle and to positively move the resilient driven member when the intermediate rocking member has reached a different predetermined angle.

28. In electric light sockets, the combination of an insulating base, a driving member mounted in the base and provided with opposed actuating surfaces, a resilient reciprocating driven member, and independently mounted means between the driving member and the resilient driven member and actuated by the opposed actuating surfaces on the driving member to actuate the resilient driven member.

29. In electric light sockets, the combination of an insulating base, a driving member mounted in the base and provided with actuating surfaces, a resilient driven member, and pivoted means between the driving member and the resilient driven member and actuated by the opposed actuating surfaces on the driving member to actuate the resilient driven member.

30. In electric light sockets, the combination of an insulating base, a driving member mounted in the base and provided with actuating surfaces, a resilient driven member, and pivoted means mounted between the driving member and the resilient driven member and provided with grooves or valleys, said pivoted means being actuated by the actuating surfaces on the driving member.

31. In electric light sockets, the combination of an insulating base, a driving member mounted in the base and provided with opposed actuating surfaces, a resilient driven member, and pivoted means mounted between the driving member and resilient driven member and provided with grooves or valleys and with kickers or accelerators to coöperate with the resilient driven member.

32. In electric light sockets the combination of an insulating base, a rotary driving member provided with opposed actuating surfaces, a resilient reciprocating driven member having a contact arm and an actuating arm, an intermediate member mounted between the rotary driving member and the resilient reciprocating driven member and adapted to coöperate with the resilient driven member, and electrical contacts cooperating with the driven member.

33. In electric light sockets, the combination of an insulating base, a rotary driving member provided with opposed actuating surfaces, a resilient reciprocating driven member having a contact arm and an actuating arm, a pivoted intermediate member mounted between the rotary driving member and the resilient reciprocating driven member and adapted to coöperate with the resilient driven member and the driving member, and electrical contacts adapted to coöperate with the driven member.

34. In electric light sockets, the combination of an insulating base, a rotary driving member provided with opposed actuating surfaces, a resilient reciprocating driven member having a contact arm and an actuating arm, an intermediate member provided with valleys to coöperate with the actuating arm of the resilient driven member, and electrical contacts to coöperate with the driven member.

35. In electric light sockets the combination of an insulating base, a rotary driving member provided with opposed actuating surfaces, a resilient reciprocating driven member having a contact arm and an actuating arm, an intermediate member provided with valleys and kickers or accelerators, to coöperate with the actuating arm of the resilient member, and electrical contacts to coöperate with the driven member.

36. In an electric light socket, the combination of an insulating base formed of a plurality of parts having meeting surfaces extending substantially longitudinally of the socket and provided with dovetail surfaces, a screw shell provided with dovetail surfaces to coöperate with those carried by the insulating sections, and means to secure the insulating sections and the screw shell together.

37. An electric light socket comprising an insulating base; a fixed terminal on said base; and a switch mechanism for making the circuit through said fixed terminal including a rotary driving member, a rocking member operated by the rotary member, a movable terminal, a spring operatively connected to said movable terminal, said rocking member storing energy in said spring, and the latter when released moving the moving terminal into contact with the fixed terminal.

38. An electric light socket comprising an insulating base; a fixed terminal on said base; and a switch mechanism for making the circuit through said fixed terminal including a rotary driving member, a rocking member operated by the rotary member, a movable member comprising a terminal portion and a spring portion operatively connected together, the rocking member storing energy in the spring portion and the latter moving the terminal portion into contact with the fixed terminal.

39. An electric light socket comprising an insulating base; a fixed terminal on said base; and switch mechanism for making the circuit through said fixed terminal including a rotary driving member, a movable terminal and a spring operatively connected together, the rotary member being operatively connected with the spring to store energy therein and the spring when released moving the movable terminal into contact with the fixed terminal.

TONJES AUGUST CARL BOTH.

Witnesses:

LEON STRAUSS,

ISAAC STRAUSS.